United States Patent [19]

Shibata et al.

[11] 4,236,181
[45] Nov. 25, 1980

[54] DEFECT DETECTING DEVICE

[76] Inventors: Ituo Shibata, 6-14 Matsukaze-cho, Hiratsuka-shi, Kanagawa-ken; Noboru Yamaguchi, 1101-1 Azamasaka, Isogo-machi, Isogo-ku, Yokohama-shi; Shuichi Shibata, 1-30-26 Goten, Hiratsuka-shi, Kanagawa-ken, all of Japan

[21] Appl. No.: 898,078

[22] Filed: Apr. 20, 1978

[30] Foreign Application Priority Data

Apr. 28, 1977 [JP] Japan .................................. 52-49734

[51] Int. Cl.³ ...................... H04N 7/18; G01N 21/00; G01N 21/88; B29F 1/00
[52] U.S. Cl. .................................... 358/106; 358/101; 250/562; 250/572; 356/237; 425/137
[58] Field of Search ...................... 358/106, 105, 101; 250/562, 572; 356/237; 425/137

[56] References Cited

U.S. PATENT DOCUMENTS 3,642,401   2/1972   Wilson ................................ 425/137

*Primary Examiner*—Robert L. Griffin
*Assistant Examiner*—Edward L. Coles
*Attorney, Agent, or Firm*—Gerald J. Ferguson, Jr.; Joseph J. Baker

[57] ABSTRACT

A visible image of an apparatus including a movable element to be watched is formed on the CRT of a television by means of an industrial television camera. One or more photosensors are provided on the face plate of the CRT to receive light from the image of the apparatus. When the movable element of the apparatus is moved from an original position, the output of the photosensor is changed. This, it is electrically detected whether or not the movable element exists in its given position by watching the output level of the photosensor.

12 Claims, 7 Drawing Figures

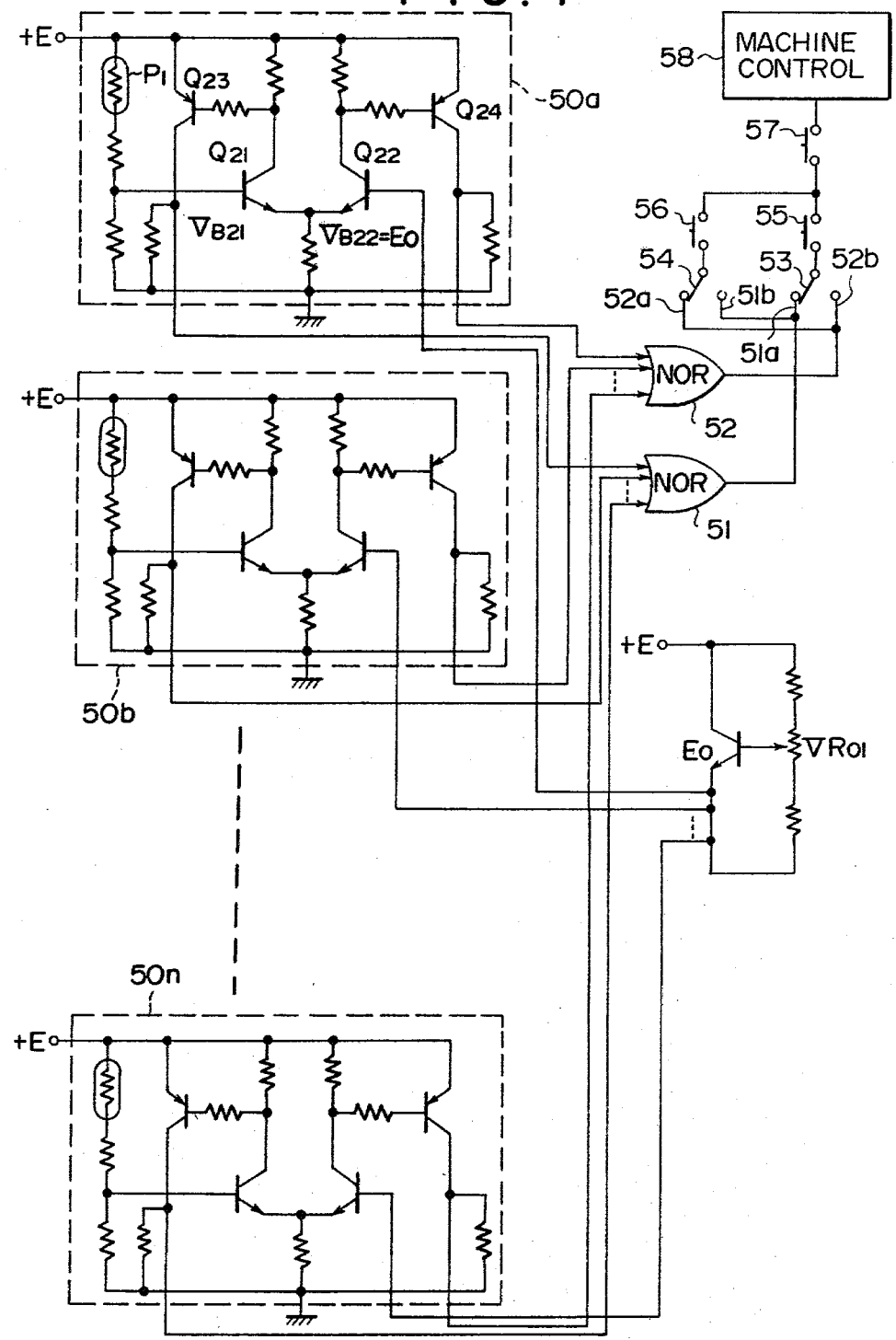
F I G. 4

DEFECT DETECTING DEVICE

BACKGROUND OF THE INVENTION

1. Field of the Invention

This invention relates to a non-contact type defect detecting device for detecting whether or not parts or elements of apparatus or systems are accurately located in or removed from some predetermined positions, and more particularly to a non-contact type defect detecting device for detecting whether or not an element or a part of an apparatus or system is precisely positioned at or completely removed from a predetermined position at a certain time of an operating cycle of the apparatus or system. This invention is particularly applicable to a watching device in a plastic injection molding system for watching the incomplete separation of the molded article from the mold.

2. Description of the Prior Art

Apparatus or systems generally include movable parts or elements which are to be moved relative to other parts. In order to precisely operate the apparatus or systems, such movable parts or elements must be moved in order. If the movable parts or elements are not precisely positioned at a predetermined position with respect to other elements where the elements should be positioned at a certain time of an operating cycle of the apparatus or systems, the apparatus or systems would get out of order, and sometimes would be damaged. In order to watch whether or not the movable parts are moved in order, or in order to ensure that the movable parts are precisely moved in response to movement of other parts, there have conventionally been used limit switches, micro switches or photoelectric switches which are disposed at the position to see if the movable parts are moved to or from the predetermined position.

However, the limit switch or the micro switch has a drawback in that they must be located close to the apparatus and put into direct contact with the movable parts or elements (hereinafter simply referred to as movable parts). Accordingly, the limit switch or the micro switch cannot be used unless there is a space for the switch to be located in contact with the movable parts and the switch is able to be in direct contact with them. When these kinds of switches cannot be used, photoelectric switches can be used. However, the photoelectric switches must be accurately located with respect to the movable parts so that they are surely actuated in response to the movement of the movable parts. Accordingly, there is required a long time and a skill when the location of the photoelectric switches is changed to change the operational mode of the apparatus or system.

In a plastic injection molding machine, a molten plastic material is injected under pressure into a closed mold cavity formed between a movable mold half and a fixed mold half to fill the cavity. The movable half is moved away from the fixed half to open the mold after the plastic material is filled and cooled in the cavity, and the hardened article is removed from the cavity. Then, the movable half is moved toward the fixed half to be pressed thereagainst to form the closed mold cavity again. In an automatic operational mode of the plastic injection molding machine, the hardened article is automatically ejected from the movable mold half by means of ejector pins and falls by its gravity. However it often happens that the article or a part of the article does not fall from the movable half sticking thereto or the article remains in the fixed half being grasped thereby. If the mold halves are closed with the hardened article left therebetween, the mold halves would be damaged since the article is normally displaced from the cavity and the mold halves are pressed against each other with an extremely high pressure.

Accordingly, it is generally required to use a mold watching device for watching whether the hardened plastic material is left in the mold. When the plastic material is left in the mold, the mold watching device gives a signal to the injection molding machine so as not to close the mold.

As the watching device, there have conventionally been used a weight scale type mold watching device which confirms that whole of the hardened plastic article including products, a runner, a sprue and the like has fallen from the mold by comparing the overall weight of the plastic article falling onto the scale with a predetermined standard weight. The standard weight is preset in accordance with the overall weight of the plastic article which should fall from the mold. When the overall weight of the plastic article which has fallen onto the scale is smaller than the standard weight, the watching device indicates that a part of the molded plastic article remains in the mold.

However, the weight scale type mold watching device is disadvantageous in that it requires a long time to carry out the determination with a sufficient accuracy when the mold includes a number of cavities to obtain a number of products of very small weight in one shot, since the weight of each product may ordinarily change in every shot. Further, even if the mold has a single cavity, the watching device would malfunction when a part of the plastic article left in the mold is very small in weight relative to its overall weight. Even such a small amount of plastic material could damage the mold.

Furthermore, the weight scale type mold watching device is usually located below the mold. The space below the mold is generally limited. Therefore, when the space is occupied by the watching device, it is difficult to provide a transferring means such as a conveyor belt for transferring the article falling from the mold to another processing station.

Further, plastic injection molds generally have a plurality of fixed pins and movable pins. Such fixed pins as well as the movable pins could be accidentally bent during a number of operation cycles of the injection machine. The fixed pins are generally received in recesses or holes provided in the corresponding mold half. Therefore, when the fixed pin is bent to get out of alignment with the corresponding recess or hole, the fixed pin would be broken when the mold is closed. The movable pins are generally projected from the inner surface of one mold half when the mold is opened and are retracted from the surface being pressed by the surface of the other mold half upon closure of the mold. When the movable pins are bent, they could not be retracted and would be damaged upon closure of the mold. At the same time, when the fixed or movable pins are broken, they could possibly scratch the surface of the cavity.

Needless to say, said weight scale type mold watching device cannot see whether the fixed or movable pins are in the right position thereof.

SUMMARY OF THE INVENTION

In light of the foregoing observations and the description, the primary object of the present invention is to provide a defect detecting device which can be used in various kinds of apparatus and system to detect whether a part or element of the apparatus or systems is at the right position thereof without touching the part or element.

Another object of the present invention is to provide a non-contact type defect detecting device which can be used in various kinds of apparatus or system to detect whether a movable part or element thereof is precisely moved relative to other parts or elements.

Still another object of the present invention is to provide a non-contact type defect detecting device which can be easily made to conform to a change in operational mode of the apparatus or system to be defect detected.

A specific object of the present invention is to provide a plastic injection mold watching device capable of detecting in an extremely short time whether a hardened plastic article remains in the mold.

Another specific object of the present invention is to provide a plastic injection mold watching device also capable of detecting whether pins or projections, especially movable pins of the mold are precisely at their respective given position.

Still another specific object of the present invention is to provide a plastic injection mold watching device which does not occupy a space below the mold.

Still another specific object of the present invention is to provide a plastic injection mold watching device which can be easily modified to watch a different mold.

In accordance with the present invention, a visible image of a part of the apparatus or system including at least a portion thereof in which a movable element to be watched should be positioned or from which a movable element to be watched should be moved is formed on an image forming medium by way of an image forming means. One or more photosensors are positioned adjacent to the image forming medium to measure the brightness of a point or points of the visible image. The outputs of the photosensors are sent to a determining circuit to determine whether the movable element to be watched is at or moved from the predetermined position.

As the image forming means, a television camera or an optical lens system can be used. When a television camera is used as the image forming means, a cathode ray tube of the camera is regarded as the image forming medium. When an optical lens system is used as the image forming means, a focusing plate is used as the image forming medium. A pin hole camera system can also be used instead of the optical lens system.

Said photosensors may be of any type of conventional photoelectric elements including photoconductive cells such as CdS cells and photovoltaic cells such as SBC which convert the amount of light received thereby to a value of electricity. The photosensor is put or the surface of the image forming medium so that the light from a selected point of the image formed on the medium is received thereby.

For example, when the defect detecting device of this invention is used to watch a mold of a plastic injection molding machine, the image forming means is positioned to form the image of the mold on the image forming medium. One or more photosensors are positioned to receive light from the image of a cavity or core of the mold. Generally the luminance of plastic material is different from that of the material forming the mold. Therefore, when the cavity or the core is covered with the plastic material or when the plastic material remains in the cavity or the core, the amount of light received by the photosensor differs from the amount of light received thereby when the cavity or core is free of the plastic material.

When the difference between luminance of the image of the plastic material and that of the material of the mold is too small, it is desirable to process the surface of the cavity or the core to enlarge the difference. Further, plastic material is generally colored in various colors such as red, green and blue, and the surface of the mold is ordinarily gray. Accordingly, the difference between luminances of the images of the plastic material and the mold can be enlarged by providing a color filter between the mold and the image forming means. The color filter may be either one which selectively cuts off the spectral range of the color of the plastic material or one which selectively transmits the spectral range of the color. Such a color filter may also be disposed between the image forming medium and the photosensors. When the surface of the mold is processed to have high reflectivity, it is preferred to use a color filter to darken the image of the plastic material.

The defect detecting device of this invention can be utilized in various kinds of apparatus or systems other than plastic injection molding machine to watch whether their elements are precisely moved relative to each other. Further, the defect detecting device of this invention can be utilized in various kinds of apparatus or systems to watch whether the elements or parts which should be positioned at a certain position are correctly in their position, or the elements or parts which should not be at a certain position are not in such a position.

BRIEF DESCRIPTION OF THE DRAWINGS

FIG. 4 is a circuit diagram of another example of the determining circuit.

DESCRIPTION OF THE PREFERRED EMBODIMENTS

Figure 1:
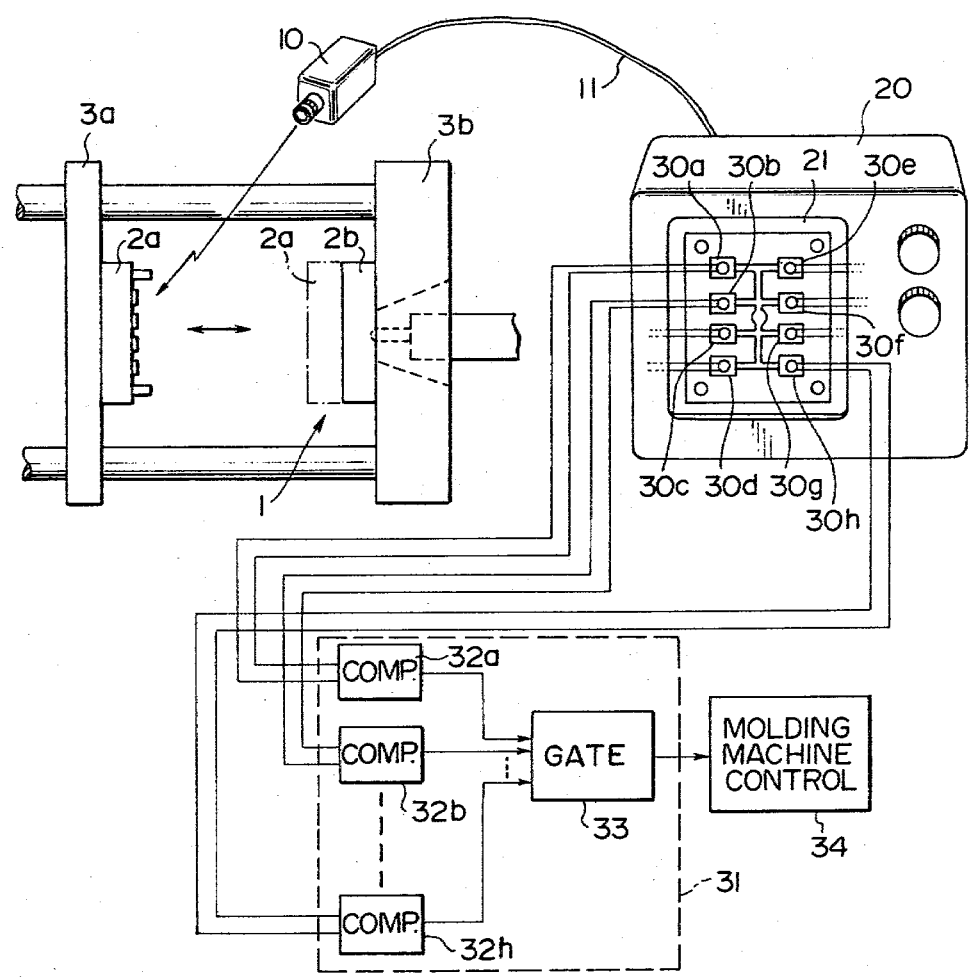
FIG. 1 is a schematic view illustrating a plastic injection mold watching device in accordance with an embodiment of this invention.

FIG. 1 is a schematic view illustrating a plastic injection mold watching device in accordance with an embodiment of this invention.

In FIG. 1 the plastic injection mold 1 consists of a movable mold half 2a and a fixed mold half 2b. The movable mold half 2a is secured to a movable die-plate 3a of a plastic injection molding machine, while the fixed mold half 2b is secured to a fixed die-plate 3b. The movable mold half 2a is moved back and forth to open and close the mold 1 as the movable die-plate 3a is moved back and forth.

When the mold 1 is closed to form closed cavities therein, liquid plastic material is pressed into the cavities to fill them. After the plastic material is hardened, the movable mold half 2a is moved apart from the fixed mold half 2b to open the mold 1. When the movable mold half 2a is sufficiently separated from the fixed mold half 2b, the hardened plastic article is ejected and falls downward by its gravity. Then the movable mold half 2a is again moved toward the fixed mold half 2b to close the mold 1.

Figure 2:
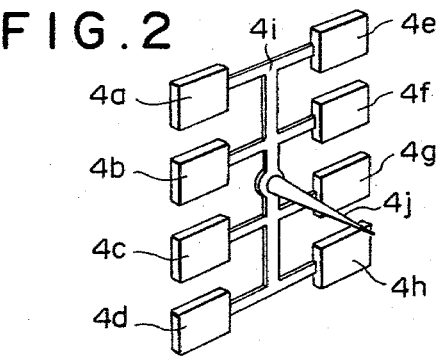
FIG. 2 shows a configuration of an overall plastic article to be ejected from the movable mold half shown in FIG. 1.

The mold 1 of this example is designed to simultaneously mold eight products 4a–4h (FIG. 2) of plate-like shape. Accordingly, the movable mold half 2a has eight core portions, only four of which can be seen in FIG. 1, and the fixed mold half 2b has also eight cavity portions (not shown). The hardened plastic article is ordinarily moved together with the movable mold half 2a and ejected therefrom. The ejected plastic article should comprise the eight products 4a–4h, runner 4i and sprue 4j as shown in FIG. 2. In other words, the whole plastic article as shown in FIG. 2 must fall out of the movable mold half 2a prior to next closure of the mold 1. Otherwise, the mold 1 would be damaged by a mold closing pressure as is well known in the art.

The plastic injection mold watching device of this embodiment comprises an industrial television camera 10, an industrial television set 20 having a screen 21, eight photosensors 30a–30h and a determining circuit 31, said television camera 10 being connected with the television set 20 by way of a cable 11.

The determining circuit comprises eight comparators 32a–32h and a logic gate 33. Said photosensors 30a–30h are connected to the comparators 32a–32h, respectively.

An image of the movable mold half 2a is formed on the screen 21 of the television set 20 by way of the television camera 10. Said eight photosensors 30a–30h are selectively positioned on the screen 21 to receive light from the images of the eight core portions, respectively.

The quantity of the light received by each photosensor when the core portion corresponding thereto is exposed, i.e. when the product carried by the core has been fallen, is different from that when the core portion is covered with the plastic material, i.e., when the product remains on the core. For example, the former is lower than the latter.

The level of the brightness thus measured by the respective photosensors 30a–30h are compared with a predetermined level in the comparators 30a–30h, respectively. If the measured brightness indicates that the core corresponding to a photosensor is exposed, the comparator connected therewith outputs a binary "zero" signal and otherwise a binary "unit" signal, for example. The output signals of the comparators 32a–32h are fed to a logic gate 33. The logic gate 33 sends a signal to prevent closure of the mold 1 to a control circuit 34 of the plastic injection molding machine when at least one of the signals is "1". The control circuit 34 is therefore arranged to permit the closure of the mold 1 only when all of the output signals of the comparators 32a–32h is "0".

In this embodiment, the number and the positions of the photosensors are selected so that only the core portions are watched. However, by using a more number of photosensors and by positioning them to receive the light from other parts of the image of the mold 1, it is possible to watch whether the molded plastic article remains in the mold at the position other than the core portions, for example on the portion carrying the runner.

Further, if one or more portion of each product could remain on the core portion, two or more photosensors are positioned so that a single product may be watched by a plurality of the photosensors.

Further, it is possible to dispose a number of photosensors to cover the whole area of the image of the movable mold half 2a, thereby enabling the photosensors to sense the remaining plastic article even when the plastic article is once released from a portion of the mold 2a on which it is originally carried and rests upon another portion of the mold half 2a.

The brightness measured by the respective photosensors are compared with the predetermined standard level of brightness. The standard level can be determined in accordance with either the luminance of the image of the background of the plastic article, i.e. the surface of the mold, or the luminance of the plastic article. Actually, the standard level is set therebetween considering the variation in the ambient light. Further, it is preferred to provide a monitoring photosensor to shift the standard level according to the variation in the ambient light.

Figure 3:
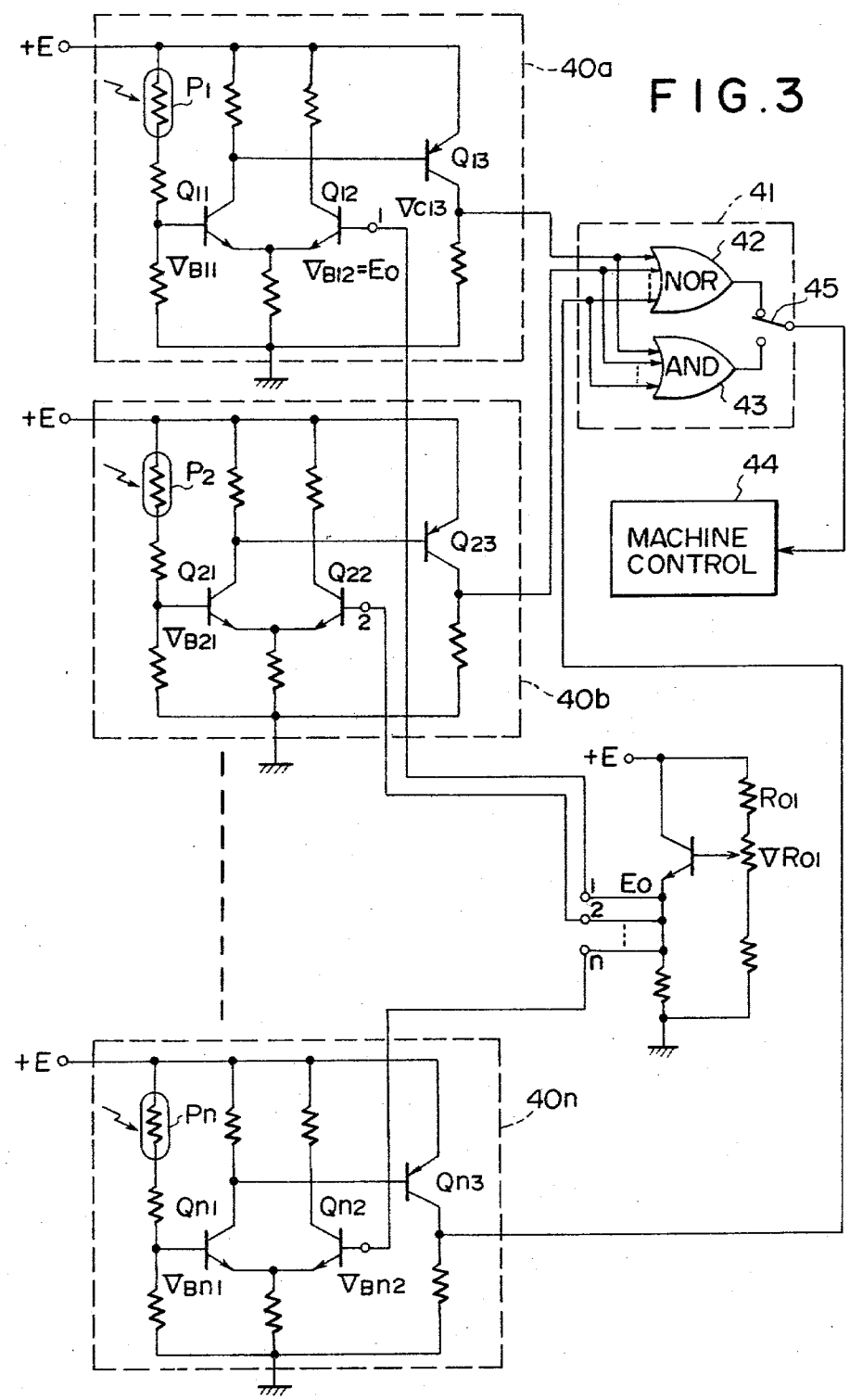
FIG. 3 is a circuit diagram of an example of a determining circuit.

FIG. 3 is a circuit diagram of an example of the determining circuit.

The determining circuit of this embodiment includes a plurality of comparators 40a–40n and a logic gate 41. Each of the comparators 40a–40n is connected to the logic gate 41 in parallel. The comparators 40a–40n are identical with each another. Accordingly, only the first comparator 40a will be described in detail hereinbelow. In this example, CdS cells are used as the photosensors.

The comparator 40a includes a threshold logic circuit which comprises first, second and third transistors Q11, Q12 and Q13, the first and second transistors Q11 and Q12 constituting a differential amplifier while the third transistor Q13 constituting an inversion amplifier. To the input side of the threshold logic circuit is connected a CdS cell P1. The resistance of the CdS cell P1 which varies in accordance with quantity of light received thereby is converted to the electric potential at the base of the first transistor $V_B11$. The base potential $V_B11$ of the first transistor Q11 corresponding to the quantity of the light received by the CdS P1 is compared with the base potential $V_B12$ of the second transistor Q12 which is equivalent to the standard potential E0. The standard potential E0 is preset between potentials respectively corresponding to the luminance of the image of the surface of the movable mold half 2a and that of the surface of the plastic article. The standard potential E0 can be varied by operating a variable resistor $V_R01$.

As can be seen from the circuit diagram shown in FIG. 3, the collector potential $V_C13$ of the third transistor Q13 is equivalent to the potential of the power source (i.e. $V_C13=E$) when $V_B11>E0$, while the collector potential is equal to the potential of the ground (i.e. $V_C13=0$) when $V_B11>E0$. Thus, a binary unit signal is outputted from the collector of the third transistor Q13 when $V_B11>E0$, while a binary zero signal is outputted therefrom when $V_B11>E0$, assuming that the binary signal "1" represents the potential E and the signal "0" represents the potential 0. Accordingly, the binary signal "1" indicates that the plastic article exists at the position in the mold seen by the CdS cell P1, and the binary signal "0" indicates that the plastic article does not exist at the position, when the luminance of the image of the plastic article is higher than that of the mold, and vice versa. Which luminance is higher between the luminance of the image of the plastic article and the luminance of the image of the mold is determined by measuring the luminances in advance.

Said logic gate 41 includes a NOR gate 42 and an AND gate 43. The output of the comparators 40a–40n is connected to both the gates 42 and 43. The gates 42 and 43 are connected to the control circuit 44 of the injection molding machine by way of a manually operable change-over switch 45.

Even when only one comparator outputs a signal which indicates that the plastic article remains on the mold, the mold should not be closed. Therefore, when it is determined that the brightness of the plastic article is higher than that of the mold, said change-over switch 45 is operated to connect the NOR gate 42 to the control circuit 44. On the other hand, when the brightness of the plastic article is lower than that of the mold, the change-over switch 45 is operated to connect the AND gate 42 to the control circuit 44.

The NOR gate 42 outputs a signal "1" only when the input signals are all "0", and otherwise outputs a signal "0". The AND gate 43 outputs a signal "1" only when the input signals are all "1", and otherwise outputs a signal "0". Said control circuit 44 of the plastic injection molding machine is connected to the logic gate 41 to prevent closure of the mold when a signal "0" is inputted, or to permit closure of the mold only when a signal "1" is inputted. Thus, the mold cannot be closed when the plastic article remains in the mold.

The resistor R01 in FIG. 3 may be replaced by a CdS cell which is positioned to always receive light from an image of the mold. By this arrangement, said standard potential can be automatically shifted in accordance with the level of the ambient light and with the brightness of the television screen which would vary with age.

Actually, a pair of mold watching devices would be required in case that the plastic article could possibly remain in the fixed mold half being grasped thereby, one of the devices being used to watch the movable mold half and the other being used to watch the fixed mold half.

As is well known in the art, the hardened plastic article is generally moved away from the fixed mold half grasped by the cavity of the movable mold half and then ejected from the movable half. Therefore, it is possible to watch the plastic article remaining not only in the movable half but also in the fixed half by first confirming that the whole plastic article is carried on the movable half and then confirming that the whole plastic article is completely ejected from the movable half.

The first confirmation should be carried out immediately before the ejection of the hardened plastic article and the second confirmation should be carried out immediately before the movable half begins to move toward the fixed half or immediately thereafter. Further, it is preferred that both the confirmations or detections be carried at the same position of the movable half, since the position of the image of the movable half on the television screen 21 moves as the movable half moves.

Upon the first detection, the determination circuit should control the injection mold control circuit to prevent the closure of the mold, if at least one of the photosensors receives light from the image of the movable mold half, and the determination circuit controls the injection mold control circuit to prevent the closure of the mold if at least one of the photosensors receives light from the image of the plastic article upon the second detection.

Thus, in case that the luminance of the plastic material is higher than that of the movable mold half, the signal "1" outputted from each comparator indicates "normal" upon the first detection, while the signal "0" outputted from each comparator indicates "normal" upon the second detection. In other words, when at least one signal "0" is outputted from the comparator upon the first detection, the injection mold should not be closed, and when at least one signal "1" is outputted from the comparator upon the second detection, the injection mold should not be closed.

In case that the luminance of the image of the plastic material is lower than that of the image of the movable mold half, the reverse is the case.

Therefore, the signal outputted from the comparator upon the first detection should be inputted to the logic gate in the inverted form. Theoretically, this can be carried out by adding to the determining circuit shown in FIG. 3 inversion circuits which are selectively connected between the comparator and the logic gate by means of change-over switches upon the first detection. However, such a determining circuit is not preferable since it requires inversion circuits and change-over switches of a number equal to the number of the comparators.

FIG. 4 shows a preferred example of a determining circuit which can be used to carry out the double detection. The determining circuit of this example includes a plurality of comparators 50a–50n which are connected to first and second NOR gates 51 and 52.

The comparators 50a–50n are identical with each another. Accordingly, only the comparator 50a will be described in detail hereinbelow. The comparator 50a is essentially a symmetrical threshold logic circuit comprising a differential amplifier including a first and second transistors Q21 and Q22, and third and fourth transistors Q23 and Q24 respectively connected to the collectors of the first and second transistors Q21 and Q22.

As can be seen, the potentials at the collectors of the third and fourth transistors Q23 and Q24 are against to each other. In other words, if the collector potential of this transistor Q23 is equivalent to the power source potential +E, the same of the fourth transistor Q24 will be equivalent to the ground potential 0, and vice versa. The collectors of the both transistors Q23 and Q24 are respectively connected to the first and second NOR gates 51 and 52. Accordingly, when the base potential $V_B21$ of the first transistor Q21 corresponding to the amount of light received by a CdS cell P1 is higher than the base potential $V_B22$ of the second transistor Q22 equivalent to the standard potential E0 determined by a variable resistor $V_R01$, a binary signal "1" is inputted to the first NOR gate 51 and a binary signal "0" is inputted to the second NOR gate 52. When the $V_B21$ is lower than $V_B22$, the reverse is the case.

The first NOR gate 51 is connected to a control circuit 58 of an injection molding machine through two different ways 51a and 51b. The first way 51a connects to the control circuit 58 via a first change-over switch 53, a first relay switch 55 and a limit switch 57. The second way 51b connects to the control circuit 58 via a second change-over switch 54, a second relay switch 56 and the limit switch 57.

The second NOR gate 52 is also connected to the control circuit 58 through two different ways 52a and 52b. The first way 52a connects to the control circuit 58 via the second change-over switch 54, the second relay switch 56 and the limit switch 57. The second way 52b connects to the control circuit 58 via the first change-over switch 53, the first relay switch 56 and the limit switch 57.

Both the change-over switches 53 and 54 are changed over to connect the first ways 51a and 52a of the NOR gates 51 and 52, when the luminance of the image of the plastic article is determined to be higher than that of the movable mold half. When the luminance of the image of the plastic article is determined to be lower than that of the movable half, the change-over switches 53 and 54 are changed over to connect the second ways 51b and 52b.

Said first relay switch 55 is turned on when the movable mold half is moved forward to close the mold, while the second relay switch 56 is turned on when the movable mold half is moved rearward to open the mold. Said limit switch 57 is located near the rearmost position of the movable mold half and closed when the movable mold half is passed thereover.

The operation of the determining circuit of this example will hereinbelow be described with reference to the case that the brightness of the image of the plastic material is higher than that of the movable mold half.

In this case, the change-over switches 53 and 54 are changed over to connect the first ways 51a and 52a of both NOR gates 51 and 52 to the control circuit 58 of the injection molding machine.

The first detection is carried out before the ejection of the plastic article to detect whether the whole plastic article is carried by the movable mold half when the movable mold half passes over the limit switch 57. On the way of its rearward movement, the limit switch 57 is closed. At this time, the second relay switch 56 is closed and the first relay switch 55 is opened. Therefore, only the second NOR gate 52 is connected to the control circuit 58. When the base potential $V_B21$ of the first transistor Q21 is lower than the standard potential E0, namely when the plastic article is not moved from the fixed mold half, a binary signal "1" is inputted to the second NOR gate 52 through the fourth transistor Q24. The second NOR gate 52 generates a binary signal "0" to control the control circuit 58 of the injection molding machine to prevent the closure of the mold, when at least one of the comparators 50a–50n generates a binary signal "1".

The second detection is carried out immediately after the ejection of the plastic article to detect whether the whole plastic article is completely removed from the movable mold half. When the movable mold half passes over the limit switch 57 on the way of its forward movement, the limit switch 57 is closed. At this time, the first relay switch 55 is closed and the second relay switch 56 is opened. Accordingly at this time, only the first NOR gate 51 is connected to the control circuit 58. When the base potential $V_B21$ of the first transistor Q21 is higher than the standard potential E0 which is the case that the plastic article yet remains in the movable mold half, a binary signal "1" is inputted into the second NOR gate 52 through the third transistor Q23. When at least one of the output signals of the comparators 50a–50n generates a binary signal "1", the second NOR gate 52 outputs a binary signal "0" to prevent the closure of the mold.

In the determining circuit shown in FIG. 4, the standard potential E0 for the comparators is determined by a common variable resistor $V_R01$. However, a plurality of variable resistors may be provided so that the different standard potentials can be determined for different photosensors. This will be particularly effective when the light does not uniformly impinge upon the entire area of the movable half.

Further, the threshold logic circuits of the comparators 50a–50n may be changed to a Schmidt trigger circuit to increase reliability of the switching action of the comparators.

Figure 5:
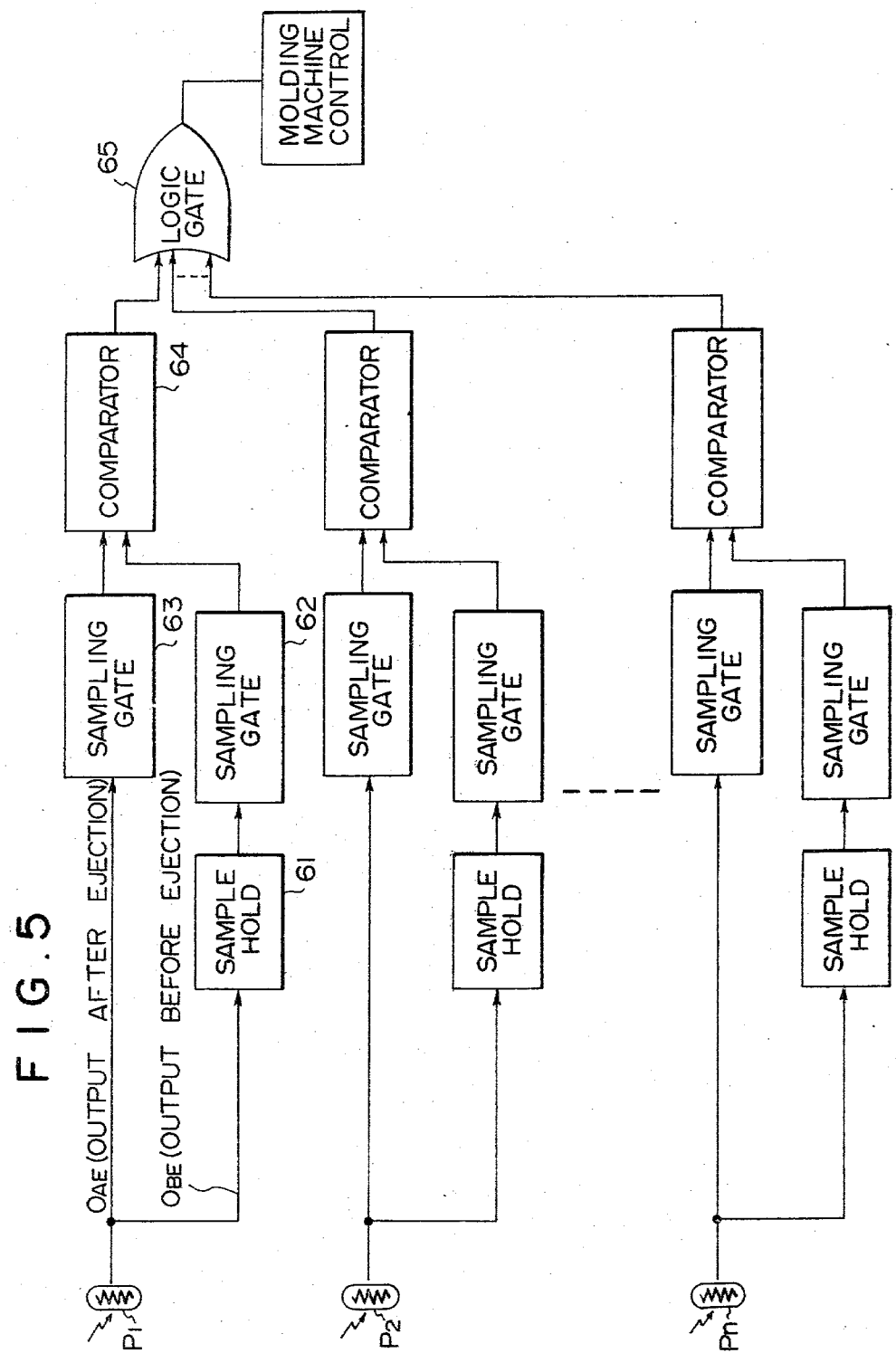
FIG. 5 is a block diagram illustrating still another example of the determining circuit.

FIG. 5 is a block diagram illustrating another example of the determining circuit of the mold watching device capable of watching both the mold halves by a single unit. In this example, the difference of the outputs of each photosensor before and after ejection of the plastic material is measured. For example, if the luminance of the image of the plastic article is higher than that of the movable mold half, the output of each photosensor before the ejection of the plastic material will be higher than that after the ejection of the plastic material so long as the plastic article is carried by the movable half and subsequently completely ejected therefrom. Thus, if the outputs of a photosensor in said two positions are equal to each other, it can be determined that the portion of the movable half watched by the sensor did not take the plastic article out of the cavity or the portion of the movable half still carries the plastic article. Then, the closure of the mold should be prevented.

As shown in FIG. 5, the output OBE of each photosensor P1-Pn generated immediately before the ejection of the plastic article is sampled by a sample hold circuit 61 and held thereby until a first sampling gate 62 is opened. While, the output OAE of each photosensor P1-Pn generated immediately after the ejection is inputted to a comparator 64 through a second sampling gate 63. The first and second sampling gates 62 and 63 are simultaneously opened after the ejection and before the forward movement of the movable mold half starts so that both the outputs OBE and OAE of each photosensor P1-Pn are simultaneously inputted into the comparator 64. The comparator 64 compares the outputs OBE and OAE with each other to output a binary signal "0", for example, when the output OBE is higher than the output OAE and to output a binary signal "1" when the former is lower than the latter. The output signal of each comparator 64 is inputted to a logic gate 65. When the luminance of the image of the plastic article is higher than that of the movable mold half, the logic gate 65 allows the closure of the mold only when the input signals are all "0". When the former is lower than the latter, the logic gate 65 allows the closure of the mold only when the input signals are all 37 1".

The determining circuit of this example can be regarded to be most preferable since it is not influenced by the variation of the ambient light, because in this determining circuit the determination is carried out through the difference between the two outputs of the photosensor before and after the ejection. The time interval between these samplings is quite short and is at most several seconds.

As can be seen from the description of this invention with reference to the mold watching device, the concept of this invention can be utilized in an extremely wide range of apparatus or systems. The photosensors can be easily positioned to watch desired parts or elements of the apparatus or systems by viewing their images on the image forming medium. The image formed on the image forming medium can be easily enlarged to expand the spaces between adjacent elements to be watched in the image so that even if the spaces between the elements are quite limited the photosensors can be easily and precisely positioned.

Figure 6:
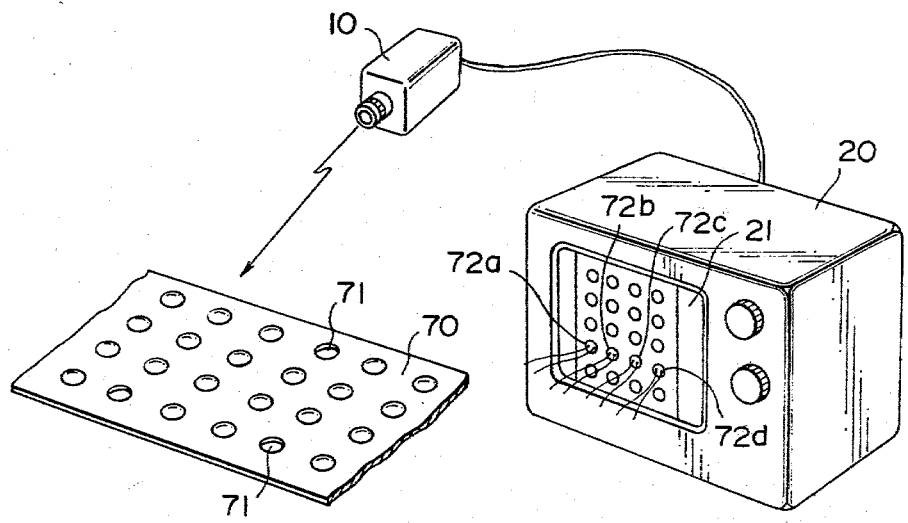
FIG. 6 is a schematic view illustrating another embodiment of this invention.

FIG. 6 shows another embodiment of this invention for detecting whether recesses provided on a belt conveyor for transferring tablets or the like are completely filled with the tablets.

In FIG. 6, the tablets are transferred by a belt conveyor 70. The belt conveyor 70 is provided with a plurality of recesses 71 arranged in four parallel lines. In order to detect whether all the recesses 71 are filled with the tablets, there has conventionary been used a photoelectric switches comprising a light emitter and a light receptor. The light emitter is disposed on one side of the belt conveyor 70 to emit a light beam in the transverse direction of the belt conveyor 70 and the light receptor is disposed on the other side of the conveyor 70 to receive the light beam. Four pivotable members are aligned with each other in the transverse direction of the belt conveyor 70. Each pivotable member is swung upwardly lifted by the tablet when the recess filled with the tablet passes beneath the pivotable member. Each of the pivotable member has an opening in its body portion. The openings of the members are aligned with each other when the members are all swung upwardly and the light beam emitted from the light emitter passes through the aligned openings and reaches the recepter.

However, the conventional watching device is disadvantageous in that the openings of the pivotable member are required to be accurately aligned with each other and with the path of the light beam, which involves substantial difficulties in setting the device. Further, when the thickness of the tablet is changed, the position of the light emitter and the receptor must be changed. Furthermore, the tablets must inherently be put into contact with the pivotable member, which is not preferable from a sanitary viewpoint.

In accordance with this invention, a visible image of a part of the belt conveyor 70 is formed by a television camera 10 on the face plate 21 of a cathode ray tube of a television set 20. Four photosensors 72a–72d are placed on the face plate 21 at equal intervals at the position of the images of the recesses 71. The output of the photosensors 72a–72d is sampled and a determining circuit (not shown) determines whether the recesses 71 are filled with the tablets. The determining circuit is operated in synchronization with the travel of the belt conveyor 70 so that the circuit is energized when the images of the recesses 71 are aligned with the corresponding photosensors 72a–72d.

Figure 7:
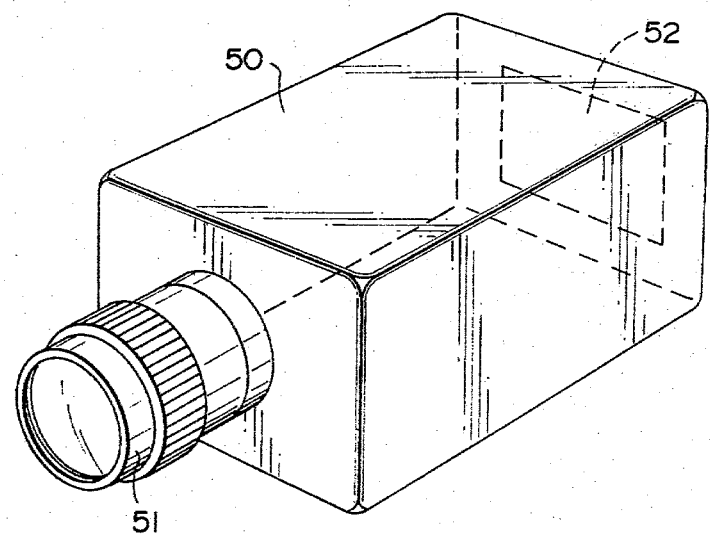
FIG. 7 is a perspective view showing an example of the image forming means and the image forming medium employed in this invention.

Although the television system comprising a television camera 10 and a television set 20 are used as the image forming means and the image forming medium, respectively, in the above embodiments, they may be replaced with an optical focusing system 50 comprising an optical lens 51 and a focusing plate 52 as shown in FIG. 7.

The television system is more advantageous than the optical focusing system, since the contrast and brightness of the image formed on the cathode ray tube can easily be controlled to match characteristics of the photosensors. By correcting the contrast, for example, the difference in luminance between the plastic material and the movable mold half can be enlarged.

Further in case of the television system, said difference in luminance can be enlarged by conducting a gamma correction. When the gamma value is made larger than unit, the brightness of images of light color is enhanced. When the gamma value is made smaller than unit, the brightness of images of dark color is lowered. Therefore, even if the difference in luminance of the plastic article and the mold is very small, the contrast of the image can be enhanced to facilitate the detection.

When it is desired to simultaneously watch a plurality of points arranged at small intervals, it is desired to form the image of the object including the points in enlarged scale. Further, in such a case, it may be possible to use a number of optical fiber bundles to guide light from the image forming medium to the photosensors.

We claim:

1. A plastic injection mold watching device for detecting whether a hardened plastic article or a portion thereof remains in a movable mold half or in a fixed mold half of a mold in a molding machine where normally the hardened plastic article remains in the movable mold half as the latter half is separated from the fixed mold half and then the article is removed from the movable mold half after the latter half has been moved a predetermined distance from the fixed mold half, said device comprising, an image forming means for forming a visible image on an inner surface of said movable mold half on an image forming medium, photosensor means mounted on the image forming medium to receive light from at least a portion of the image formed thereon and give an output indicative of the brightness thereof, and determining means responsive to said photosensor means includes means actuable before the plastic article is ejected to confirm that the whole plastic article is carried by the movable mold half and further means for determining whether the hardened plastic article remains in the movable mold half after the plastic article should have been ejected therefrom.

2. A plastic injection mold watching device as defined in claim 1 wherein said determining means accomplishes said determination by comparing the output of the photosensor means with a predetermined standard value.

3. A plastic injection mold watching device as defined in claim 2 wherein said standard value is determined between the output of the photosensor means when it receives light from the image of the mold half and the output of the same when it receives light from the image of the plastic article.

4. A plastic injection mold watching device as defined in claim 1 wherein said determining means measures the difference between the outputs of the photosensor means immediately before and after the plastic article is ejected to determine that the whole plastic article is moved from the fixed mold half being carried by the movable mold half and completely ejected therefrom when the measured difference is larger than a predetermined value.

5. A plastic injection mold watching device as defined in claim 1 wherein said image forming means comprises an industrial television camera and said image forming medium comprises a cathode ray tube of a television set connected with the television camera.

6. A plastic injection mold watching device for detecting whether a hardened plastic article or a portion thereof remains in a movable mold half or in a fixed mold half of a mold in a molding machine where normally the hardened plastic article remains in the movable mold half as the latter half is separated from the fixed mold half and then the article is removed from the movable mold half after the latter half has been moved a predetermined distance from the fixed mold half, said device comprising, an image forming means for forming a visible image on an inner surface of said movable mold half on an image forming medium, photosensor means mounted on the image forming medium to receive light from at least a portion of the image formed thereon and give an output indicative of the brightness thereof, and determining means responsive to said photosensor means for determining whether the hardened plastic article remains in the movable mold half after the plastic article should have been ejected therefrom wherein said determining circuit accomplishes said determination by comparing the output of the photosensor with a predetermined standard value wherein said standard value is determined between the output of the photosensor when it receives light from the image of the mold half and the output of the same when it receives light from the image of the plastic article and wherein said standard value is automatically shifted depending on the level of the ambient light according to the output of an additional photosensor which is disposed to always receive light from the image of the mold half.

7. A plastic injection mold watching device for detecting whether a hardened plastic article or a portion thereof remains in a movable mold half or in a fixed mold half of a mold in a molding machine where normally the hardened plastic article remains in the movable mold half as the latter half is separated from the fixed mold half and then the article is removed from the movable mold half after the latter half has been moved a predetermined distance from the fixed mold half, said device comprising an image forming means for forming a visible image on an inner surface of said movable mold half on an image forming medium wherein said image forming means comprises an industrial television camera and said image forming medium comprises a cathode ray tube of a television set connected with the television camera and wherein said television camera includes a color filter attached to the taking lens thereof, photosensor means mounted on the image forming medium to receive light from at least a portion of the image formed thereon and give an output indicative of the brightness thereof, and determining means responsive to said photosensor means for determining whether the hardened plastic article remains in the movable mold half after the plastic article should have been ejected therefrom.

8. A plastic injection mold watching device as defined in claim 7 wherein the luminance of the plastic article is higher than that of the mold and said color filter selectively transmits the spectral range of the color of the plastic article, thereby enhancing the contrast of the image formed on the cathode ray tube.

9. A plastic injection mold watching device as defined in claim 7 wherein the luminance of the plastic article is lower than that of the mold and said color filter is does not transmit the spectral range of the color of the plastic article, thereby enhancing the contrast of the image formed on the cathode ray tube.

10. A plastic injection mold watching device for detecting whether a hardened plastic article or a portion thereof remains in a movable mold half or in a fixed mold half of a mold in a molding machine where normally the hardened plastic article remains in the movable mold half as the latter half is separated from the fixed mold half and then the article is removed from the movable mold half after the latter half has been moved a predetermined distance from the fixed mold half, said device comprising, an image forming means for forming a visible image on an inner surface of said movable mold half on an image forming medium wherein said image forming means comprises an industrial television camera and said image forming medium comprises a cathode ray tube of a television set connected with the television camera wherein said television camera includes a means for carrying out a gamma value correction, photosensor means mounted on the image forming medium to receive light from at least a portion of the image formed thereon and give an output indicative of the brightness thereof, and determining means responsive to said photosensor means for determining whether the hardened plastic article remains in the movable mold half after the plastic article should have been ejected therefrom.

11. A plastic injection mold watching device as defined in claim 10 wherein said gamma value is larger than unit to positively enhance the brightness of an image of light color and enhance the contrast.

12. A plastic injection mold watching device as defined in claim 10 wherein said gamma value is smaller than unit to positively lower the brightness of an image of dark color and enhance the contrast.

* * * * *